(12) United States Patent
Djang et al.

(10) Patent No.: US 8,217,826 B1
(45) Date of Patent: Jul. 10, 2012

(54) GENETIC ALGORITHM ENHANCEMENT OF RADAR SYSTEM SURVIVABILITY

(75) Inventors: Philipp Arthur Djang, Las Cruces, NM (US); Frank Lopez, El Paso, TX (US); Gene E. Herriman, El Paso, NM (US); Eduardo Ruiloba, Jr., El Paso, TX (US); Edward Friday, Las Cruces, NM (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 148 days.

(21) Appl. No.: 12/897,841

(22) Filed: Oct. 5, 2010

(51) Int. Cl.
*G01S 13/00* (2006.01)

(52) U.S. Cl. ............................................. 342/13; 342/16

(58) Field of Classification Search ............... 342/13–20
See application file for complete search history.

(56) References Cited

U.S. PATENT DOCUMENTS

| | | | |
|---|---|---|---|
| 6,175,331 B1 * | 1/2001 | Woodsum et al. | 342/373 |
| 2009/0012768 A1 * | 1/2009 | Son et al. | 703/13 |
| 2011/0127378 A1 * | 6/2011 | McDonnell | 244/110 F |
| 2012/0036096 A1 * | 2/2012 | Omar et al. | 706/14 |

OTHER PUBLICATIONS

Bucciarelli, A., "Genetic algorithms and radar code design", The Proceedings of the 8th International Conference on Signal Processing Applications & Technology, vol. 2, pp. 1862-1866.

Yilmaz, A., "Evolving Sensor Suites for Enemy Radar Detection", pp. 1-12.
Burkhalter, J.E. "Genetic Algorithm Application to Missile System Design and Optimization", Naval Air Warfare Center, Weapons Div. China Lake, 2002.
Moore, F., "A methodology for missile countermeasure optimization under uncertainty", vol. 10, Issue 2 (Summer 2002), pp. 1-3.
Moore, F., "Improving Means and Variances of Best-of-Run Programs in Genetic Programming", Proceedings of the Ninth Midwest Artificial Intelligence and Cognitive Science Conference, 1998.
Moore, F., "A Genetic Programming Methodology for Missile Countermeasures Optimization Under Uncertainty", pp. 1-10.

* cited by examiner

*Primary Examiner* — Timothy A Brainard
(74) *Attorney, Agent, or Firm* — John H. Raubitscheck

(57) ABSTRACT

A process for enhancing radar system survivability against a threat includes the construction of multiple computational radar function chromosomes with each of the chromosomes having values for geometric configuration and operational parameters for at least one radar station emitter and at least one decoy. A genetic algorithm analysis is performed on a computer including a crossover operator and a mutation operator to determine a fitness value for multiple chromosomes against the threat. By configuring and operating the radar system based on a survivability value for the fitness value of the genetic algorithm analysis, radar system survivability against a threat is enhanced. A radar system employing genetic algorithm analysis is also provided.

20 Claims, 2 Drawing Sheets

US 8,217,826 B1

GENETIC ALGORITHM ENHANCEMENT OF RADAR SYSTEM SURVIVABILITY

GOVERNMENT INTEREST

The invention described herein may be manufactured, used, sold, imported or licensed by or for the United States Government.

FIELD OF THE INVENTION

The present invention relates to improving radar survival against a threat, and in particular to the use of a genetic algorithm to rapidly converge on radar configurations and operational parameters to improve survivability.

BACKGROUND OF THE INVENTION

Air and missile defense radar systems provide early warning as to both battlefield and theater threats. A well designed air and missile defense radar system provides sufficient advance warning for ground personnel to take evasive actions, interceptor aircraft or missile assets can be vectored towards the threat, or electronic jamming devices employed. Owing to the effectiveness of air and missile defense radar systems against an aggressor, conventional air attack doctrine includes an anti-radiation missile (ARM) attack component to blind a defender as to an airborne threat and create air and/or missile attack corridors. Even in instances where a defender retains air superiority, the threat of ARM attack persists owing to growing prevalence of mobile ground fired ARM and drones deploying ARMs.

A problem with defending an air and missile radar defense system against a potential threat is the complexity of the problem. To model a radar defense system and its perceived performance against an ARM threat involves approximately 200 interdependent variables resulting in a stochastic computation that is so complex that to analyze all the valid combinations involves millions of computational runs. As a result, even with high speed computational resources, radar system operational optimization in the face of an evolving threat is currently so slow as to effectively be intractable. Genetic algorithms have been shown effective in optimizing peak to side lobe ratio radar ambiguity functions. T. Bucciarelli et al., Proceedings of the 8$^{th}$ Intl. Conf. on Signal Processing Applns and Tech., Miller Freeman, Vol. 2, pages 1862-1866 (1997). Genetic analysis has also been used in the identification and design of optimal teams of sensors to detect enemy radars using genetic analysis. Yilmaz et al., "Evolving Sensor Suites for Enemy Radar Detection". However, these past efforts have not addressed issues related to improving radar defense system survivability against ARMs.

Currently, radar emitting beacon decoys are used to enhance radar survivability by presenting radar signal clutter to deceive an ARM. Typically, a decoy emits operational radar-like signals, so as to distract or confuse an ARM. However, the geometric configuration of a decoy or group of decoys in a radar system is complex. Likewise, the operational conditions of a radar and the related decoys to blunt a given ARM threat is a complex problem that may evolve in real time based on the threat scenario.

Thus, there exists a need to enhance configurational and operational parameters of a defense radar system against an ARM threat. There further exists a need to calculate configurational and operational parameters in an efficient way with resort to genetic analysis to maximize a fitness function for a given set of configurational and operational parameters using a survival of the fittest approach. Genetic algorithms are not known to have previously been applied to the problem of enhancing radar system survival against ARM threat.

SUMMARY OF THE INVENTION

A process for enhancing radar system survivability against a threat includes the construction of multiple computational radar function chromosomes with each of the chromosomes having values for geometric configuration and operational parameters for at least one radar station emitter and at least one decoy. A genetic algorithm analysis is performed on a computer including a crossover operator and a mutation operator to determine a fitness value for multiple chromosomes against the threat. By configuring and operating the radar system based on a survivability value for the fitness value of the genetic algorithm analysis, radar system survivability against a threat is enhanced. A radar system employing genetic algorithm analysis is also provided.

DESCRIPTION OF THE PREFERRED EMBODIMENTS

Figures 1, 2:
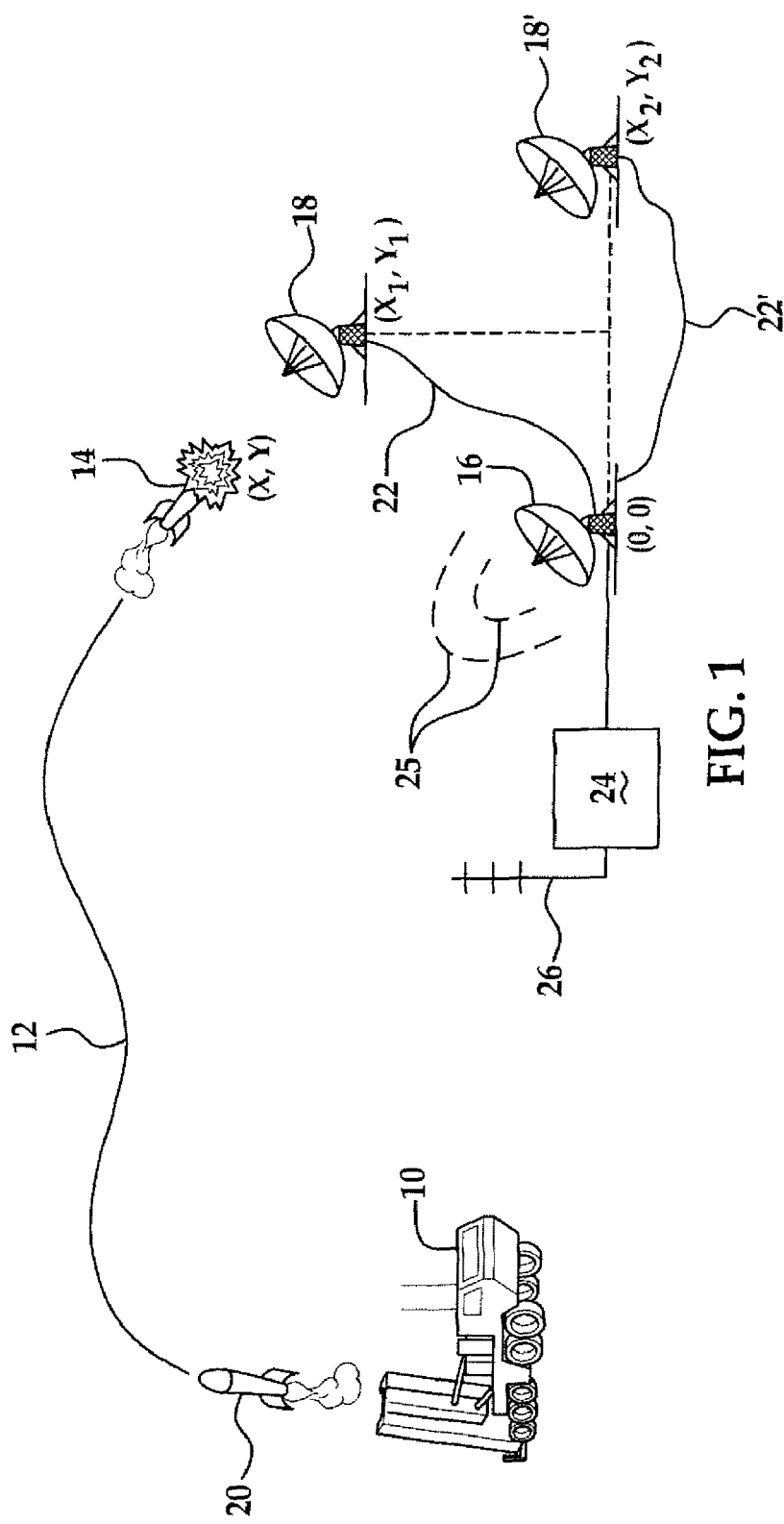
FIG. 1 is a schematic of a radar system in an ARM launch environment.
FIG. 2 is a block diagram approach to an exemplary simulation.

The present invention has utility in providing a process for enhancing radar systems against an anti-radiation missile (ARM) threat. A novel genetic algorithm is used with a simulation of survivability for a given chromosome, to obtain configurational and operational parameters with enhanced survivability. Previous approaches have used decoys that mimic radar, where survivability of the radar then depended on the location and mimicked behavior of each decoy. However, the complexity of these systems is so large that a full analysis of the problem has previously been intractable.

An inventive hybrid genetic algorithm is provided that allows optimization of the operational states, locations, and number of radars and decoys used to enhance survivability of a radar station to an evolving threat.

In a representative example, a novel hybrid genetic algorithm is designed to allow optimization of the survivability of at least one radar station emitter and at least one decoy against an anti-radiation missile (ARM) attack. The algorithm provides configurational and operational parameters of the radar and decoy(s). Optionally, the number of decoys and decoy configuration relative to the actual radar station emitter is provided for design of a new station. Alternatively, a decoy number, decoy configurational position, operational functions, or combinations thereof are fixed to provide an enhanced survival chromosome for a deployed radar system. This ability to rapidly compute a chromosome of radar system parameters allows for evolution in system operation in a timeframe sufficient to counter a new threat as it develops or storage in a digital library of survivability values for a given threat. The configurations and operational parameters are determined by a novel genetic algorithm, and a specialized scoring system provides feedback to the genetic algorithm as to the fitness value performance of any given chromosome of radar system configuration and operational parameters to propagate a new generation of chromosomes with operator usage to improve chromosome fitness. By way of example, the flight, fuse point of an ARM, and survivability characteristics of a radar station emitter and decoy(s) are stochastically simulated to score the fitness of a tested chromosomal solution.

The results of the genetic analysis are used to propagate genes having fitness in subsequent generations of solution chromosomes to enhance the survivability of a radar and decoy(s) against the threat. By scoring chromosomes against different evolutionary pressures, different survival enhancing chromosomes are obtained against various threats illustratively including survivability against various threat scenarios such as a ripple fired multiple missile attack, survivability against a missile attack as a function of missile launch parameters, and survivability against a plurality of missiles fired from various locations, and commando launched ARM attack proximal to the radar system. Thus, when a threat evolves, a chromosome adapted to have a protective fitness value is implemented from a library of chromosomes, each optimized under different evolutionary threat pressures.

As used herein, a chromosome is defined as a function $c_i(x)$ where i equals 1, ... N where N is the dimension of the population of possible solutions; x is the configurational and operational parameters of the radar system and illustratively includes values for radar emitting element failure percent, decoy number, decoy radiating power, decoy blink, and decoy activation time. Each of the configurational and operational parameter values in a chromosome is described herein synonymously as a gene.

According to the present invention, an initial population of chromosomes having certain genes, each individually fixed or bounded by a given range based on real world operation is scored individually to provide a fitness value against a user input threat. The bounding of values is critical to obtaining useful fitness values for radar system operation. As a counter example, optimal survivability against ARM threat converges to the system being inactivated permanently. While a radar station with no operation is a valid theoretical solution, in practice allowing a chromosome to converge to this solution without a radar active range is of no practical value. Chromosomes having a fitness that enhances survivability against the threat better than the fitness of other chromosomes, are propagated preferentially into the next generation of chromosomes with the process repeated to iteratively evolve chromosomes with survivability against a given threat. To facilitate rapid evolution of a fitness value for a radar station configuration operational parameter chromosome, genetic operators are applied during the course of the evolutionary genetic algorithm analysis to facilitate offspring inheritance of genes enhancing overall fitness. Genetic operators used in an inventive genetic algorithm analysis include a crossover operator C that binds chromosomes to generate new individuals. An example of a single homogeneous crossover operator function for a two chromosome case is provided in Formula I that leaves the progeny chromosomes of equal length as the parent chromosomes.

$$\begin{matrix} c_1 : abc - def \\ c_2 : ghi - jkl \end{matrix} \Rightarrow C \begin{bmatrix} abc & def \\ ghi & jkl \end{bmatrix} \rightarrow X \begin{matrix} c_1' : abc - jkl \\ c_2' : ghi - def \end{matrix} \qquad (I)$$

where $c_1$ and $c_2$ are parent chromosomes 1 and 2 and progeny chromosomes after operation of the single homogeneous crossover operator C are $c_1'$ and $c_2'$. It is appreciated that while biological genetics only allows for the operation of a given operator between two chromosomes, the computational genetics of the present invention are not so limited and as such an inventive genetic algorithm operator such as the crossover operator described above as well as other operators described herein are readily applied in ways non-analogous to biology to evolve a progeny generation of fitness scorable chromosomes. According to the present invention, a multiple crossing homogeneous crossover operator is preferably applied with a frequency input by a user, with that frequency defined as a probability of crossover. The probability of crossover is preferably according to the present invention a variable dependent upon the rate of change in the fitness value as the chromosomes evolve. A homogeneous multiple crossover operator creates more than the single crossover of Formula I in progeny chromosomes of like length.

Another operator used to impart diversity to a chromosome population during fitness evolution is a mutation operator, M. The mutation operator functions to place a given gene with a different value from within a range for the given gene or change a gene condition, for example to exchange "on" for "off". A stochastic mutation operator according to the present invention is fixed to allow real world values for a given gene. The mutation operator is applied with a user supplied probability, $P_M$. Preferably, the mutation operator probability is applied as a function of the rate of change in fitness value between succeeding generations of iterative chromosomes.

Iterative generations incorporate parent fitness values using the parent roulette wheel method in which the area of a circle, corresponding to a probability of 1, the wedge area of the circle encompassed by a particular chromosome being proportional to the fitness value of that chromosome and as such a greater likelihood of contribution to the next generation of chromosomes. The parent roulette wheel method retains population size between generations. In addition to the stochastic operator of crossover which is a subset of recombinatorial stochastic operators, a small probability random mutation is introduced.

Additional operators that are optionally applied to a population to facilitate convergence to a survivability fitness value optionally include an inversion operator that swaps gene values in a single chromosome around an inversion plane, a clone operator that copies a chromosome without any change and effectively doubles the area in the roulette wheel, a zap mutation that changes the value of a gene or part of a chromosome to another value, and a creep mutation that changes the value of a gene by plus or minus one unit.

Through the use of an inventive genetic algorithm tailored to complexities of radar system survivability, an inventive genetic algorithm provides rapid convergence to survivability fitness value chromosomes even though the underlying search space of radar system survivability variables is not completely understood. As a result, an inventive genetic algorithm provides superior conversion to other search techniques or calculus based techniques such as Fibonacci sets and sorting; enumerative techniques such as dynamic programming, depth first searching (DFS), and breadth first searching (BFS); and other guided random search techniques inclusive of simulated annealing and random walk extrema optimization.

The fundamental basis for genetic algorithm analysis according to the present invention is found in the aforementioned references. A scoring system uniquely detailed herein tests chromosome fitness with distinct criteria unique to a radar system survivability simulation.

A novel genetic algorithm is developed to interact with the radar simulation to optimize survivability. Each chromosome included configuration and parameter setting genes. The simulation is used to create a score based on the miss distance from the radar and the decoys. The score is then used as a measure of the fitness of the chromosome, the term "fitness value" being analogous to survival of the fittest in evolutionary genetics. The score in turn is used to provide an area proportional to a chromosome fitness for use in a roulette wheel selection of chromosomes for propagation into the next iterative generation. A fitness value is protective when the fitness value achieves at least survival of the radar itself and preferably components decoys against a given threat.

Special chromosomes are used including genes that are the features and behaviors of the radar and decoys. Further, special operators were used to ensure feasibility of the performance of the genetic algorithm.

A partial example of an inventive chromosome is shown below in Table 1.

TABLE 1

| Radar Emitting Element Failure | Number of Decoys | Decoy Radiating Power | Decoy Blink | Decoy On Time |
|---|---|---|---|---|
| 5% | 2 | 10 KW | True | 1.3 sec |

In simulations other parameters are included, but these are not important for illustration of the novel aspects of this example. The radar simulation is used to evaluate a score based on the parameters included within the chromosome. The evolutionary stressor used to evolve the genetic solution in this simulation is a pre-determined scenario. The scenario consists of a single ARM attack with the following initial conditions: launch angle of 190 deg off-boresight to the radar, launch height of 10 ft above sea level, launch distance of 500 miles from the radar, and with the ARM seeker locked on to the radar at launch. All missile and launch platform aerodynamics were appropriately modeled. The genetic algorithm then selects the fitter chromosomes using the score determined by the simulation. The genetic algorithm included a novel crossover operator and a novel mutation operator. The operators are restricted so as to not create unfeasible or illegal combinations, within specific rules. For example each decoy must have at least a non-zero $(X_n + Y_n)$ location so that chromosomes specifying a number of decoys should have corresponding locations in their associated genes, where n is the number of each decoy in a system.

The crossover operator employed multipoint homogeneous match crossovers. Table 2 below illustrates a representative example.

TABLE 2

| Chromosome | Radar Emitting Element Failure | X/Y Decoy 1 | Decoy Radiating Power | Decoy Blink | Decoy On Time |
|---|---|---|---|---|---|
| Parent 1 | 5% | 2400/1600 | 10 KW | True | 1.3 sec |
| Parent 2 | 0% | 1400/900 | 5 KW | False | 0.0 sec |
| After Multi-Point Crossover | | | | | |
| Child 1 | 0% | 2400/900 | 5 KW | True | 1.3 sec |
| Child 2 | 5% | 1400/1600 | 10 KW | False | 0.0 sec |

The two parent chromosomes are selected for crossover based on rules such as random selection or based on a feature such as a like number of decoys. According to the present invention, preferably the crossover operator involves multiple crossing points with a crossover occurring on average between an average 2 to N−1 genes of the chromosome. By way of example, in a 200 gene radar system configuration and operational chromosome between 2 and 199 crossovers occur across the chromosome per application of the operator.

The mutation operator employed a restricted allele set mutation operator for a gene. The mutation operator selects from a finite set of values to replace a current value within the gene. Table 3 below illustrates a representative example.

TABLE 3

| Chromosome | Radar Emitting Element Failure | X/Y Decoy 1 | Decoy Radiating Power | Decoy Blink | Decoy On Time |
|---|---|---|---|---|---|
| Parent 1 | 5% | 2400/1600 | 10 KW | True | 1.3 sec |
| After Mutation | | | | | |
| Child 1 | 3% | 2400/3500 | 15 KW | True | 1.3 sec |

The inventive mutation operator is in contrast to that commonly employed in classical genetic analysis in that any radar operational parameters limited to specific discrete values in an inventive mutation operator are customized to operate on a specific gene and randomly replace that gene with a new value from a discrete set of feasible values.

Preferably, the chromosome reproduction scheme between generations differs from the classical roulette wheel fitness proportionate reproduction through also including an elitist strategy that retains the best performing chromosome unchanged in the progeny generation.

In a conventional genetic algorithm, the relative frequency of operator application remains fixed. Typical conventional frequencies include 75% crossover and 10% mutation. In any generation, 75% of the chromosomes are selected for crossover and 10% are selected for mutation. According to the present invention, the frequency operator application is preferably adapted based on the rate of improvement in the measurement of fitness value between chromosome generations. Preferably, if the rate of improvement slows, the proportion of chromosomes selected for mutation is increased. More preferably, the frequency of crossover operations also decreases as the rate of fitness improvement slows.

In examples of the present invention, a hybrid reproduction scheme is used. This scheme allocates additional trial through chromosomes with higher fitnesses. The number of additional trials may, for example, be proportionate to the measured fitness. The best found chromosomes from each generation were retained: an elitist strategy. This approach allows efficient exploration of a search space, and exploits high performance information by retaining the best chromosome. A novel objective function and scoring mechanism was created for the hybrid genetic algorithm. The objective function and scoring mechanism connects the missile simulation to the genetic algorithm by providing performance feedback to the genetic algorithm. The objective function algorithm takes into account the missed distance between the missile and the radar and/or decoys, while minimizing the number of decoys. The missile simulation was a stochastic simulation, and a statistically significant number of replications were used to evaluate the performance of each chromosome. Control programs were created to collect and analyze the results. These were used by the genetic algorithm to conduct an evolutionary based search for optimized survivability of the radar and decoys.

Hence the approach used in this example used a number of novel features. The genes used included the configuration and parameter value for the radar and decoys. A homogenous match multipoint crossover operator was used, in which chromosomes with similar or homogeneous characteristics, for example an equal number of decoys, were selected for multipoint crossover. This is the swapping of alleles from parent chromosomes to create children chromosomes. A novel mutation operator, a restricted set allele mutation operator, was used. As radar parameters were limited to specific values, the mutation operator recognized alleles, and randomly drew a new value from a set of feasible values.

The reproduction scheme included an elitist strategy. This included fitness proportionate reproduction and retention of best performing chromosomes. The combination of both methods is rarely used.

The operator frequency use was a further novel approach. The rate of improvement in the objective function was tracked, and this information was used to modify the percentage of crossover and mutation. For example, when the rate of improvement decreased, the percentage of crossover was decreased, and correspondingly the percentage of mutation was increased.

FIG. 1 shows a typical threat and radar system configuration, in which a missile 20 is launched from launch point 10 and follows flight path 12 to an impact point 14. The impact is proximate to a radar emitter station 16, a first decoy 18 and a second decoy 18'. A computer 24 is coupled to a station 16 to provide a computer storage library of fit radar system operational chromosomes and/or a rapid inventive genetic algorithm analysis. A communication receiver 26 is provided to input information about a developing ARM threat and in library search of fitness values or genetic analysis search. In a typical configuration a communications link 22 between the radar emitter station 16 and decoy 18 and a second communication link 22 between station 16 and 18' allows decoy pulses to mimic pulses 25 produced by the radar emitter station 16. While FIG. 1 depicts the radar emitter station 16 and two decoys 18 and 18, it is appreciated that an inventive radar system optionally includes multiple such radar emitter stations, more than two decoys or a combination thereof. While the inclusion of one decoy in a radar system is essential to enhancing system survivability against an ARM threat, more than one decoy is shown by the present invention to enhance survivability. A benefit of an inventive genetic algorithm analysis is identifying when the inclusion of an additional decoy provides enhanced survivability as well as such an inclusion affording a diminishing enhancement and survivability relative to the expense of such an additional decoy. In FIG. 1, the displacement distance between a radar emitting station 16 and decoy 18 is denoted by vectors $X_1$ and $Y_1$ while those of the second decoy 18 are denoted by $X_2$, $Y_2$, and $Z_2$. The inclusion of a vertical displacement $Z_2$ of a decoy 18' relative to the radar emitter station 16 is in recognition of radar station deployment topography or the usage of an airborne decoy. Additionally, it is appreciated that the decoy pulses emitted by decoy 18 and second decoy 18 are readily varied as a function of radiating power, decoy blink, and on time as well as geometric displacement from station 16.

To illustrate an inventive process, the threat scenario of FIG. 1 is used to construct a fitness test based on a set of input values as to characteristics of ARM detection time, ARM operational classification, and ARM initial guidance. Preferably, this threat data reflects actual experimental inputs to provide an ARM simulation. While the scenario depicted in FIG. 1 represents a prototypical threat, it is appreciated that multiple threat scenarios are optionally modeled in an inventive genetic algorithm analysis to afford a library of radar system operational parameters assuming a fixed decoy configuration relative to a radar emitter station so that any number of possible threats as detected and classified is used to select fit radar system operational chromosomes. Threat scenarios beyond that depicted in FIG. 1 include multiple ARM launches inclusive of possible variations in launch distance, location, and classification.

A given ARM simulation is used as the selective pressure in the inventive genetic analysis process based on the total number of emitter radar station hits, the number of decoy hits by an ARM, and nearest miss distance (NMD). For a given chromosome, the number of decoys in operation is either fixed at a constant value or allowed to evolve for the purpose of optimization in the building of a new radar station. A genetic algorithm running score methodology according to the present invention to score the fitness value of a given chromosome was a summation of radar hits, decoy hits, near miss distance and optionally the number of decoys used, with each value preferably weighted by a coefficient. Exemplary of these scoring coefficients are 1,000 times the number of emitter radar station hits, 100 times the number of decoy hits, 10 times the number of decoys used, and a unitary coefficient for near miss distance. It is appreciated that the selection of weighting coefficients directly affects the selection pressures on a given set of configurational and operational parameters for a radar system. The scoring scheme allows modification based on known priorities, such as relative value and/or cost of radars and decoys. Blast effect simulation includes assumptions and preferably experimental or intelligence data as to fragmentation damage, over pressure damage and other results associated with an ARM impact so as to provide realistic selection pressures on the evolution of configurational and operational chromosomes for a radar station.

A simulation was developed to determine survivability of the radar and decoy for a given impact point. Raw data was generated by high fidelity radar simulations, using actual data when available. Data is converted into time packets allowing pulse-to-pulse characteristics such as time, width, frequency, and beam position to be simulated. Various files are generated for specific operational scenarios. The data allowed creation of synchronous decoy pulses.

FIG. 2 represents a possible approach to simulation. Box 30 corresponds to ARM detection, ARM classification, and initial ARM guidance. Box 32 corresponds to inclusion of flight dynamics, and radar and decoy countermeasure (CM) effects. Box 34 corresponds to simulation of ARM trajectories using a computer. Box 36 corresponds to simulation of the blast effect, as a function of impact point relative to radar and decoy locations. The simulation includes the effects of fragmentation damage and over pressure damage.

A full simulation can include more than 200 interdependent variables. However even a subset of genes shown in the following tables provides enhanced system survivability while identifying low import variables that are readily dropped from the analysis to accrue computational speed of fitness value evolution. Hence, other non-inventive optimization approaches, configurations of radars and decoys are not analytically determined, but are positioned using expert opinion. However this approach is inefficient, and the inventive process efficiently finds an optimum radar system configuration based on a single threat scenario or a weighted likelihood of possible threats.

Figure 3:
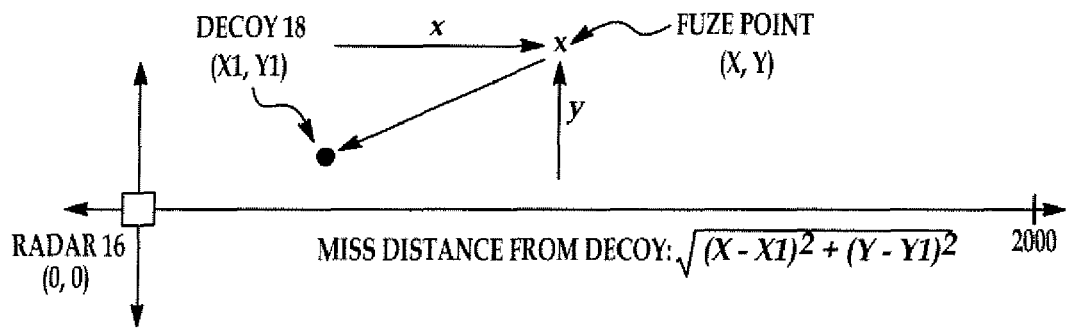
FIG. 3 is a schematic of an exemplary run-scoring methodology.

FIG. 3 illustrates the run scoring methodology used with reference to the threat depicted in FIG. 1. The radar 16 is located at an origin, a decoy 18 is located at coordinates $X_1$, $Y_1$, and the fuse point of the missile is located at point XY. The nearest miss distance (NMD) is the radial distance from the incoming missile's fuse point to the nearest emitter (decoy or radar). In this example, NMD is set to a maximum value of 9 with the maximum rewarded distance (greater than or equal to 2000 meters). NMD is set to a minimum value of 0 with the minimum rewarded distance (0) and intermediate distances are scaled to a value between 0 and 9.

By creating distinctly separated tiered values for the subgroups, the subgroups may be tiered by level of importance and/or cost. In the latter example, the radars are considered far more valuable than that of the decoys. The relative values given to radar hits and decoy hits can be adjusted according to the relative cost and/or value accorded each and adjusted as relative values are changed by cost, durability, ARM development and other illustrative external data.

A preliminary analysis is performed in which radar emitter features and decoy features are genetic at specific values in each starting chromosome. The radar ARM simulation used is preferably stochastic, and multiple accorded simulations are used to estimate the fitness of each chromosome. A statistical analysis of over 70,000 ARM simulations indicated that decoys are essential to radar survivability. Without a decoy, radar survivability is 5.1% per FIG. 1 threat. In contrast, with 3 decoys survivability increased to 98% per FIG. 1. One decoy led to survivability of 47% per FIG. 1 threat. However, the combinatorial nature of the problem precludes a complete analysis of the parameter space, and thus the improvement yielded by the inventive genetic algorithm.

Figure 4:
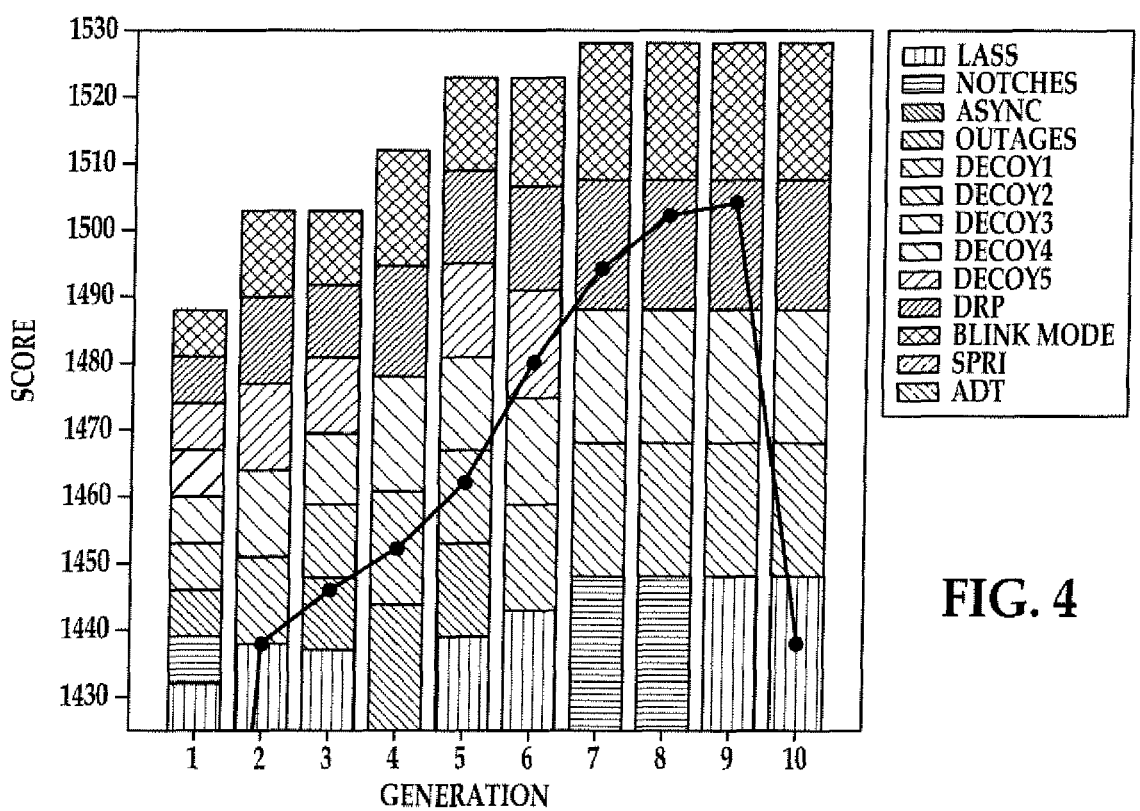
FIG. 4 is a bar graph of a genetic algorithm ARM simulation results obtained for successive chromosome generations to show fitness value evolution.

FIG. 4 is a bar graph of genetic algorithm results showing a change in fitness score as a function of generations exposed to threat evolutionary pressure. The genetic algorithm driven missile simulation produced configurations that generated large ARM miss distances. Decoy deployment characteristics were found that resulted in radar and decoy survivability. The evolutionary driven process identified high quality solutions more efficiently than simply calculating parameters within the entire search space by other calculus based, enumerative, or other guided random search techniques.

In FIG. 4, the following terms are used based to test various system operation parameters. Low ARM Signature Surveillance (LASS) is a waveform pattern of operation that a radar optionally employs. Notches refer to single features of low field strength within the radar pattern, generated by a special algorithm within the radar emission control logic. "Async" refers to a flag variable which indicates that the decoy's pulses are asynchronous to the radar pulses. Decoy radiated pulse or "DRP" is a variable that holds the value in Watts of a decoy's radiated power. Blink Mode refers to a radiation mode in which intermittent radiation is emitted by decoys. Synchronous pulse radiation intensity or "SPRI" refers to a radiation emitting mode held constant during a decoy's radiative time in seconds when turned ON. Asynchronous delay time or "ADT" refers to a radiation mode in which intermittent radiation is emitted which holds the decoy's pulse constant with a delay times in seconds.

Hence, embodiments of the present invention include a highly customized genetic algorithm to optimize radar survivability. Associated software code was developed for the genetic algorithm and is believed to be the first time a genetic algorithm is linked to an anti-radiation missile simulation.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The foregoing description is illustrative of particular embodiments of the invention, but is not meant to be a limitation upon the practice thereof. The following claims, including all equivalents thereof, are intended to define the scope of the invention.

The invention claimed is:

1. A process for enhancing radar system survivability against an anti-radiation missile threat comprising:
   constructing a plurality of computational radar function chromosomes, each of said plurality of chromosomes comprising N gene values for geometric configuration and operational parameters for at least one radar emitter station and at least one decoy;
   performing a genetic algorithm analysis on a computer using at least a crossover operator and a mutation operator to determine a fitness value for each of said plurality of chromosomes against the threat; and
   configuring and operating the radar system based on a protective survivability value against the threat for said fitness value of the genetic algorithm analysis.

2. The process of claim 1 wherein each of said plurality of chromosomes includes gene values for parameters selected from the group consisting of: radar emitting element failure percent, decoy number, decoy radiating power, decoy blink, and decoy activation time.

3. The process of claim 1 wherein each of said plurality of chromosomes has a non-zero distance between said at least one decoy and said at least one radar emitter station.

4. The process of claim 1 wherein said crossover operator operates only between two or more of said plurality of chromosomes having equivalent decoy numbers.

5. The process of claim 1 wherein said crossover operator is a homogeneous multiple crossover operator having a crossover frequency of between an average 2 and N−1 genes.

6. The process of claim 1 wherein the fitness value is obtained by scoring each of said chromosomes;
   proportionately applying at least said crossover operator and said mutation operator with a given frequency to said plurality of chromosomes; and
   generating therefrom a progeny generation of chromosomes wherein an elitist best performing chromosome is maintained in said progeny chromosomes.

7. The process of claim 1 further comprising performing a second genetic algorithm analysis against a second threat to yield a second threat protective survivability value against the second threat for the radar system; and storing said protective survivability value and said second protective survivability value in a computer storage library with recall and implementation of one of said protective survivability value and said second protective survivability value in response to information input about a developing real world threat.

8. The process of claim 1 further comprising providing a communication receiver to said computer to provide input information about a developing threat to facilitate searching said computer storage library.

9. The process of claim 1 wherein said genetic algorithm analysis is stochastic.

10. The process of claim 1 wherein said mutation operator replaces one of said gene values with a mutated value chosen from a feasible range of values for said gene value.

11. The process of claim 1 wherein an operator application frequency for said crossover operator and said mutation operator changes during the determination of said fitness value for each of said plurality of chromosomes.

12. The process of claim 11 wherein said operator application frequency for application of said crossover operator decreases and said mutation operator increases as a rate of change of said fitness value decreases between successive chromosome generations during said genetic algorithm analysis.

13. The process of claim 1 wherein said genetic algorithm analysis allocates additional application of said crossover operator and said mutation operator to one of said plurality of chromosomes having an above average score of said fitness value.

14. The process of claim 1 further comprising storing a limited subset of said plurality of chromosomes for use in subsequent chromosome generations of said genetic algorithm analysis.

15. The process of claim 1 wherein said fitness value is determined by a weighted summation of factors including at least two of: number of radar hits, number of decoy hits, and near miss distance to one of said at least one radar emitter station and said decoy.

16. The process of claim 15 wherein the near miss distance value associated with said protective survivability value for said fitness value is at least 800 meters.

17. A radar defense system comprising:
   a radar emitter station;
   a decoy placed a non-zero distance from said radar emitter station;
   a communication link between said radar emitter station and said decoy;
   a computer coupled to said radar emitter station and performing a genetic algorithm analysis to determine a fitness value for a survivability operational parameter chromosome for the system against an anti-radiation missile threat, said computer having a computer storage storing a plurality of system operational parameter chromosomes determined under different threats and the fitness value for a survivability operational parameter chromosome; and
   a communication receiver receiving developing threat data and providing the data to said computer to facilitate selection of an optimal one of said plurality of fitness values for implementation by said radar emitter station and said decoy.

18. The system of claim 17 wherein said optimal one of said plurality of fitness values controls parameters inclusive of radiating power of said decoy, blink of said decoy, activation time of said decoy, and activation time profile of said radar emitter station.

19. The system of claim 17 wherein said genetic algorithm analysis employs a parent roulette wheel methodology with an elitist retention scoring to determine said survivability operational parameter chromosome.

20. The system of claim 17 wherein said fitness value is determined by a weighted summation of factors including at least two of: number of radar hits, number of decoy hits, and near miss distance to one of said at least one radar emitter station and said decoy.

* * * * *